(12) United States Patent
Tenca

(10) Patent No.: US 8,368,342 B2
(45) Date of Patent: Feb. 5, 2013

(54) APPARATUS AND METHOD FOR GENERATING ELECTROMAGNETIC TORQUE IN AN ELECTRIC MACHINE

(75) Inventor: Pierluigi Tenca, Västerås (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/468,359

(22) Filed: May 10, 2012

(65) Prior Publication Data

US 2012/0256579 A1 Oct. 11, 2012

Related U.S. Application Data

(63) Continuation of application No. PCT/EP2009/064919, filed on Nov. 10, 2009.

(51) Int. Cl.
*H02P 27/00* (2006.01)

(52) U.S. Cl. ........ 318/764; 318/727; 318/798; 318/800; 318/801

(58) Field of Classification Search .......... 318/727, 318/764, 768, 798, 799, 800, 801; 363/9, 363/95, 96, 148, 157, 159, 160
See application file for complete search history.

(56) References Cited

U.S. PATENT DOCUMENTS

| | | | | |
|---|---|---|---|---|
| 3,686,548 A | * | 8/1972 | Onoda et al. | 318/400.27 |
| 4,060,753 A | * | 11/1977 | Okuyama et al. | 318/700 |
| 4,670,826 A | * | 6/1987 | Tanaka | 363/10 |
| 4,764,859 A | * | 8/1988 | Matsui et al. | 363/161 |
| 4,792,741 A | * | 12/1988 | Matsuo et al. | 318/800 |
| 4,996,469 A | | 2/1991 | DeLange et al. | |
| 5,008,608 A | | 4/1991 | Unsworth et al. | |
| 6,407,529 B1 | | 6/2002 | Gritter et al. | |
| 7,023,166 B1 | | 4/2006 | Kohen et al. | |
| 8,207,699 B2 | * | 6/2012 | Naiman | 318/800 |

FOREIGN PATENT DOCUMENTS

EP 0823776 A1 2/1998

OTHER PUBLICATIONS

Peter Vas, Parameter Estimation, Condition Monitoring, and Diagnosis of Electric Machines, Monographs in Electrical and Electronic Engineering, vol. 27, pp. 80-87, Mar. 18, 1993.
P. Vas, J.E. Brown, Real-time monitoring of the electromagnetic torque of multi-phase A.C. Machines, 1985 IEEE Industry Applications Conference (IAS) pp. 732-737.
International Preliminary Report on Patentability; Application No. PCT/EP2009/064919; Issued: Jan. 27, 2012; 15 pages.
International Search Report & Written Opinion of the International Searching Authority; Application No. PCT/EP2009/064919; Issued: Aug. 19, 2010; Mailing Date: Aug. 27, 2010; 12 pages.

* cited by examiner

*Primary Examiner* — Walter Benson
*Assistant Examiner* — Thai Dinh
(74) *Attorney, Agent, or Firm* — St. Onge Steward Johnston & Reens LLC

(57) ABSTRACT

An apparatus for generating electromagnetic torque in an N-phase electric machine, N being a positive integer, includes N lines, each of the N lines including an input terminal, an output terminal, and a pair of thyristors, or of one thyristor and one diode pair. The N lines are connected between a mains and the electric machine. An apparatus is provided for repeatedly or continuously determining at least the sign of a voltage over the thyristor or diode-thyristor pair in at least one of the N lines, means are provided for repeatedly or continuously determining at least one parameter related to the electromagnetic field in the electric machine, and a control device is provided for controlling the operation of the thyristor or diode-thyristor pair of the at least one of the N lines.

20 Claims, 4 Drawing Sheets

Softstarter and quantities measured inside it

Q-axis equivalent circuit in the stationary reference frame

D-axis equivalent circuit in the stationary reference frame 0-axis equivalent circuit in the stationary reference frame

APPARATUS AND METHOD FOR GENERATING ELECTROMAGNETIC TORQUE IN AN ELECTRIC MACHINE

CROSS-REFERENCE TO RELATED APPLICATIONS

The present application is a continuation of pending International patent application PCT/EP2009/064919 filed on Nov. 10, 2009 which designates the United States and the content of which is incorporated herein by reference.

FIELD OF THE INVENTION

The present invention generally relates to a control algorithm capable of generating instantaneous torque of desired sign in electric machines exchanging energy with a mains source.

BACKGROUND OF THE INVENTION

Three-by-three matrix converters using pairs of anti-parallel thyristors, preferably silicon controlled rectifiers (SCRs) on one diagonal of the matrix are often called softstarters because of their widespread use in improving the starting, accelerating as well as decelerating and stopping of three-phase squirrel-cage induction motors, which would otherwise be subject to deleterious transients during their starting and stopping phases if they were connected directly to the mains.

Because of the nature of the thyristors, as reflected by their constitutive equations, and the topological structure of this conversion circuit, the evolution of its electrical quantities can evolve in time in highly complex ways, also because the use of SCRs and possibly diodes considerably limits the possibilities of controlling such a circuit.

Despite their intrinsic limitations, the thyristors-based softstarters are widely used to accelerate and decelerate induction motors when no sophisticated quality of motion is required. Their widespread use, still today, is facilitated by their ruggedness and low cost which are still largely unmatched even by the simplest and heaviest-duty motor drives based on voltage-source, two-level, three-phase AC/DC/AC converters.

Additionally, the present availability of low cost, but significantly performing, digital control architectures allows nowadays for employing more sophisticated control techniques for the softstarters which were not economically possible decades ago since the complexity of the required analog/digital circuits rendered them unacceptable in industrial mass production at that time.

SUMMARY OF THE INVENTION

A main problem in the use of the thyristor-based softstarters for accelerating or decelerating an electrical machine is constituted by the undesired reversals of the sign of the instantaneous electromagnetic torque generated by the machine, as well as a difficult regulation of such a torque.

This reality leads to deleterious mechanical stresses both for the machine and mainly for the load attached to it.

Further, the decelerations are less efficient thereby leading to longer braking times.

Yet further, the control of the thyristor-based softstarters is limited during acceleration and deceleration due to the nature of the thyristors.

At least some of these problems and shortcomings can, in principle, be solved by adding components both inside and outside the softstarter including the use of external contactors. However, this renders the overall machine control apparatus comprising the softstarter more complex, larger, and more expensive.

It is therefore an object of the present invention to provide a thyristor-based apparatus and a method, respectively, for generating electromagnetic torque in an electric machine in order to start, to accelerate, as well as to decelerate and even to brake the electric machine, which address the above issues.

It is a further object of the invention to provide such apparatus and method, which are simple, robust, reliable, and of low cost.

These objects among others are, according to the present invention, attained by apparatuses and methods as claimed in the appended patent claims.

According to one aspect of the invention, an apparatus for generating electromagnetic torque in an N-phase electric machine, N being a positive integer, is provided. The apparatus comprises N lines, each of the N lines including an input terminal, an output terminal, and at least a pair of thyristors, or of one thyristor and one diode, connected, preferably in parallel, between the input terminal and the output terminal such that the cathode of a first one of the components in the thyristor or diode-thyristor pair is connected to the anode of the second one of the components in the thyristor or diode-thyristor pair and the cathode of the second one of the components in the thyristor or diode-thyristor pair is connected to the anode of the first one of the components in the thyristor or diode-thyristor pair. Such connection is referred to as an anti-parallel connection. The N lines are connected between a mains and the electric machine. An apparatus is provided for repeatedly or continuously determining at least the sign of a voltage over the thyristor or diode-thyristor pair in at least one of the N lines, means are provided for repeatedly or continuously determining at least one parameter related to the electromagnetic field in the electric machine, and a control device is provided for controlling the operation of the thyristor or diode-thyristor pair of the at least one of the N lines in response to at least the determined sign of the voltage and the determined parameter related to the electromagnetic field in the electric machine.

Preferably, the at least one parameter related to the electromagnetic field is a function of the magnetic fluxes and/or currents in the electric machine. Such function can be estimated from line currents as measured by apparatuses suitable to measure currents and/or voltages across each of the thyristor or diode-thyristor pairs and line-to-line voltages of the electric machine and/or of the mains, preferably at the input terminals of the N lines, as measured by apparatuses suitable to measure voltages.

Advantageously, the control arrangement is arranged to fire repeatedly at least one thyristor of the thyristor or diode-thyristor pair in the at least one of the N lines, each time only when the following conditions are met: the last voltage over the thyristor or diode-thyristor pairs gives for the thyristor a forward voltage drop of a specified size and the thyristor is directed such that a current through the thyristor, taken into account at least the sign of the function of the magnetic fluxes and/or currents in the electric machine, will generate a desired electromagnetic torque.

Still preferably, means for determining a time derivative, e.g. a total or partial time derivative, of the function of the magnetic fluxes and/or currents in the electric machine is provided, wherein the control arrangement is arranged to repeatedly or continuously fire at least one thyristor of the thyristor or diode-thyristor pair in the at least one of the lines only if at least the sign of the function of the magnetic fluxes and/or currents in the electric machine and at least the sign of the time derivative of the function of the magnetic fluxes and/or currents in the electric machine are in specified correlations.

An additional problem with the thyristor-based softstarter of prior art is that sometimes when braking the machine, it may occur that the machine begins to spin in the opposite direction. In some applications such speed reversal is not accepted.

It is therefore a particular object of the invention to provide such apparatus and method, which can be designed to prevent speed reversal of the electric machine, while no additional components in the softstarter or external contactors are necessary. Additionally, the same thyristors used for decelerating and, if desired, even stopping the electric machine should be capable of being used also for starting and accelerating the electric machine.

The use of the present invention for the purpose of decelerating a machine until it is brought to stop (braking) is based on a design that generates zero electromagnetic torque when the rotor of the electric machine is at rest, thereby significantly reducing the risks of undesired speed reversals.

According to a particular aspect of the invention the apparatus of the first aspect of the invention is provided wherein N is three and the input terminals of the three lines are connected to output terminals of a three-phase mains. When it is desired to brake the electric machine by decelerating it until it stops, the control device connects the electric machine such that electric current can flow in no more than two phases of the three-phase mains via at least the thyristor or diode-thyristor pair in the at least one of the three lines, and controls the operation of the thyristor or diode-thyristor pair in a first one of the three lines in response to the measured voltage and the determined parameter related to the electromagnetic field in the electric machine.

By having the electric machine connected to only two phases of the mains, an electromagnetic field of constant direction is created in the stator of the machine. The torque created by such a field is zero when the rotor of the machine is at rest; therefore such a connection with the mains reduces the likelihood of undesired rotation of the rotor at zero speed.

In practice each of the thyristor or diode-thyristor pairs has a parallelly connected by-pass switch which is closed during normal operation (in order to prevent the current from going through the thyristor or diode-thyristor pair during operation, thereby reducing energy losses). During the braking of the machine, the switch of the first one of the lines is open, the switch of a second line is closed, and the switch of a third line is open. Each thyristor of the thyristor or diode-thyristor pair of the first one of the lines is fired repeatedly, each time only when the following conditions are met: the measured voltage over the thyristor or diode-thyristor pairs gives for the thyristor a forward voltage above a specified values and the thyristor is directed such that a current through the thyristor, taken into account at least the sign of the function of the magnetic fluxes and/or currents in the electric machine, will generate an electromagnetic torque braking the electric machine. Alternatively, the switch of the second line is left open and the thyristor or diode-thyristor pair thereof is fired systematically to emulate a continuous connection. When each thyristor of the thyristor or diode-thyristor pair of the first one of the lines is fired, current is flowing in two phases of the mains, in two of the lines, and in one, two, or three phases of the electric machine depending on how the electric machine is configured and connected to the lines.

It shall be appreciated that one of the thyristors in each thyristor pair may be exchanged for a diode, or one of the thyristors in each thyristor pair is fired systematically to emulate the operation of a diode. In such instance, only the other thyristor of the thyristor pair or the thyristor of the diode-thyristor pair is fired repeatedly when the above-described conditions are met.

By means of the present invention softstarters with improved starting, acceleration, deceleration and braking capabilities of the mechanical load coupled to the electric machines can be provided. Additionally, speed reversal risks in machine braking after that zero speed has been reached, are minimized. The need of additional components or switches beyond the strictly minimum necessary ones is avoided.

The operation can be realized with minimum knowledge about the electric machine, e.g. limited to some nameplate data only.

Further characteristics of the invention, and advantages thereof, will be evident from the following detailed description of preferred embodiments of the present invention given hereinafter and the accompanying FIGS. 1-6, which are given by way of illustration only, and are thus not limitative of the present invention.

DETAILED DESCRIPTION OF THE INVENTION

Figure 1:
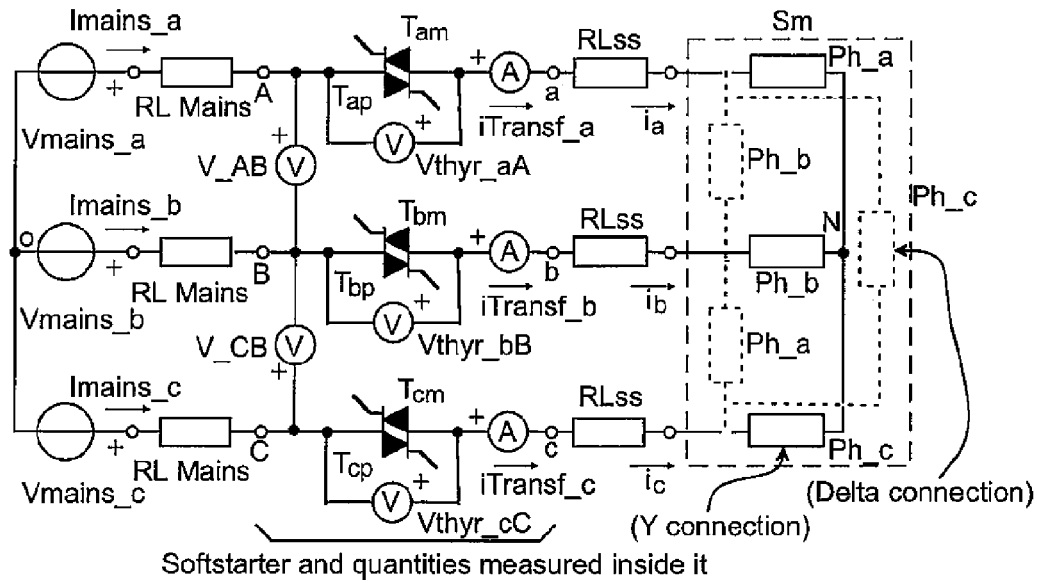
FIG. 1 displays in a schematic circuit diagram a thyristors-based softstarter connected between an electric motor and three-phase mains for generating electromagnetic torque in the electric motor according to one embodiment of the invention. Such a circuital configuration is commonly named "softstarter in line", or "softstarter in series", in the framework of the applications of such circuits.

FIG. 1 illustrates a schematic circuit diagram of a softstarter connected between an electric motor such as e.g. an induction motor and a three-phase mains for generating electromagnetic torque in the electric motor according to an embodiment of the invention. The three-phase mains may e.g.

be an electric grid, an isolated diesel driven power station or any other form of three-phase electrical source capable of delivering and/or absorbing power. The electric motor can be connected in Y or delta configuration. The softstarter comprises a matrix converter including three lines, each line including an input terminal A, B, C, an output terminal a, b, c, and a pair of anti-parallel thyristors $T_{am}$, $T_{ap}$; $T_{bm}$, $T_{bp}$; $T_{cm}$, $T_{cp}$ preferably SCRs, interconnected between the input terminal and the output terminal. The matrix converter is connected in line between the three-phase mains and the motor, e.g. by means of cables. One of the thyristors in each pair may be exchanged for a diode.

Apparatuses V suitable to measure voltages, are provided for repeatedly or continuously measuring voltages Vthyr_aA, Vthyr_bB, Vthyr_cC across each one of the pairs of thyristors and the line-to-line voltages V_AB, V_CB at the input terminals A, B, C.

Apparatuses suitable to measure electric currents, here depicted as current meters A, are provided for repeatedly or continuously measuring currents iTransf_a, iTransf_b, iTransf_c in each one of the three lines. Preferably the apparatuses are current transformers, Hall-effect sensors, or suitable resistive shunts.

Further, means are provided for repeatedly or continuously determining at least one parameter related to the electromagnetic field in the motor. This may be achieved in a plurality of manners further discussed below.

Figure 2:
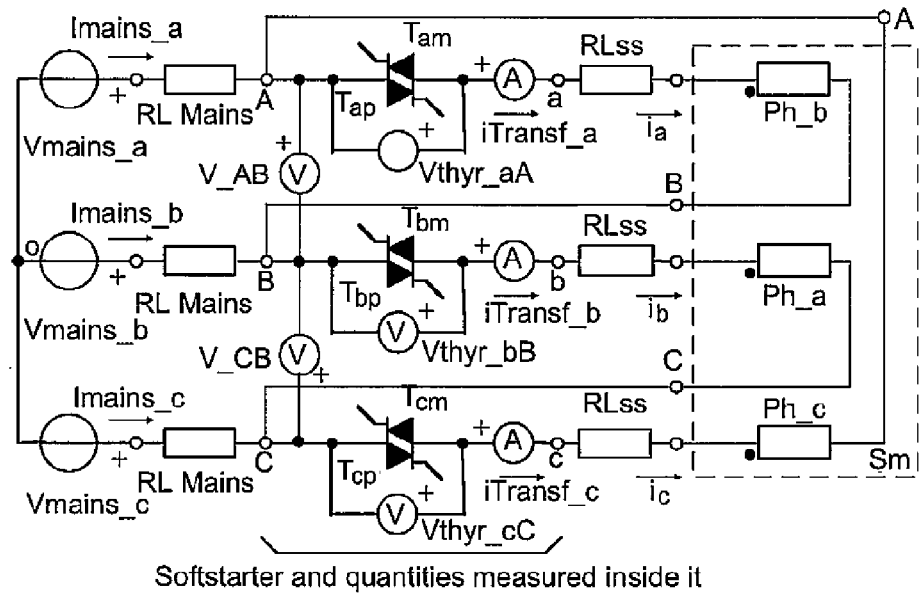
FIG. 2 displays in a schematic circuit diagram a softstarter connected to the mains and to an electric motor in such a way that each stator phase of the motor is in series with one thyristor pair for generating electromagnetic torque in the electric motor according to a further embodiment of the invention. Such a circuital configuration is commonly named "softstarter in inside-delta", in the framework of the applications of such circuits.

FIG. 2 illustrates a schematic circuit diagram of a softstarter connected between an electric motor and a three-phase mains for generating electromagnetic torque in the motor according to a further embodiment of the invention. This embodiment differs topologically from that of FIG. 1 in that the motor and the softstarter is connected in the configuration commonly named inside delta. Further, the operations of the softstarters differ, which will be further discussed below.

Generally, a control device is provided for each of the softstarters, for controlling the operation of the thyristor pairs in response to at least the sign of the voltages or currents and the determined parameter related to the electromagnetic field in the electric motor. Preferably, the parameter related to the electromagnetic field in the motor is a function of magnetic fluxes associated with the stator and/or rotor phase windings of the motor, which function may be computed from the voltages and currents measured by the apparatuses disclosed above. In an alternative version the magnetic fluxes are given using stator and/or rotor currents or using a combination of magnetic fluxes and stator and/or rotor currents as being feasible by a person skilled in the art.

The control device is arranged to repeatedly fire at least one of the thyristors of the thyristor pair in one, two, or all of the lines, each time only when the following conditions are met: the measured voltage over the thyristor pair gives for the thyristor a forward bias voltage above a specified value and the forward conducting thyristors current is directed such that, taken into account at least the sign of the function of the magnetic fluxes (which has a sign and a magnitude), an electromagnetic torque of desired sign will be generated.

Further, means for determining a time derivative of the function of the magnetic fluxes, wherein the control device is arranged to repeatedly fire at least one of the thyristors of the thyristor pair in said at least one of the N lines only if the at least the sign of the function of the magnetic fluxes and at least the sign of the time derivative of the function of the magnetic fluxes are in specified correlations. The time derivative may be a total time derivative or a partial time derivative.

While the softstarter is capable of being used for starting, accelerating, decelerating, and stopping the motor, there are some particular advantages obtained while decelerating and stopping the motor, which will be discussed further below.

Braking Configurations for Induction Motors

In practice each of the thyristor pairs may have a parallelly connected by-pass switch which is closed during normal operation. Each one of the lines can thus be connected with closed switch, connected with open switch by firing the thyristors of the thyristor pair of that line, or disconnected with open switch and no thyristor firings.

During braking of the induction motor, the induction motor is connected such that current can flow in no more than two phases of the three-phase mains via the softstarter. The following connection configurations are used for braking the induction motor in accordance with the invention. Reference is also made to Sauer, H G, D Koenig and K D Goeke, Bremsen von Drehstrommotoren mit Gleichstrom, Antriebstechnik, 31(6), 1992, the contents of which being hereby incorporated by reference.

Figure 3A:
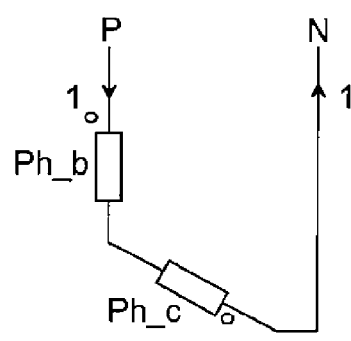
FIGS. 3A and 3B display in schematic circuit diagrams connections during braking for an induction motor connected in Y configuration and the softstarter connected in line according to different embodiments of the invention.

When the induction motor is connected in Y configuration and the softstarter is connected in line, one of the lines, in the illustrated case the upper line, of the softstarter is disconnected and the phase Ph_a of the induction motor and the corresponding phase terminal A of the mains are left disconnected as being illustrated in FIG. 3a. The phases Ph_b and Ph_c remain connected in series between two phase terminals B and C of the tree-phase mains.

Figure 3B:
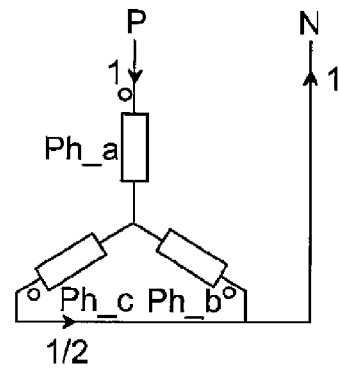

Alternatively, as it can be seen in FIG. 3b, one of the lines of the softstarter is disconnected and two of the phases (in the illustrated case phases Ph_b and Ph_c) are connected in parallel with one another and are connected in series with the last phase (in the illustrated case phase Ph_a). However, this embodiment requires an additional contactor for connecting the two phases in parallel and it is therefore a less preferred solution.

Figure 4A:
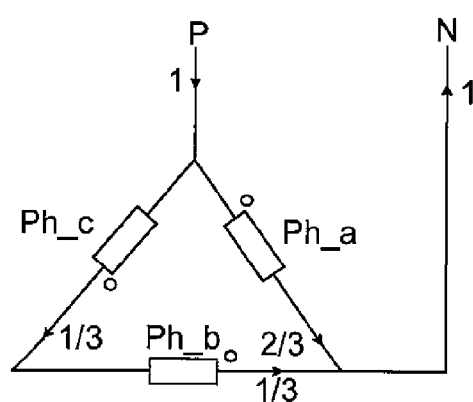
FIG. 4A displays in a schematic circuit diagram a connection during braking for the induction motor connected in delta configuration and the softstarter connected in line according to a further embodiment of the invention.

When the induction motor is connected in delta configuration and the softstarter is connected in line, one of the lines, in the illustrated case the upper line, of the softstarter is disconnected and the corresponding phase terminal A of the mains is left disconnected. The phases the induction motor are connected as being illustrated in FIG. 4a. The induction motor is again connected to only two of the phases of the three-phase mains.

Figure 4B:
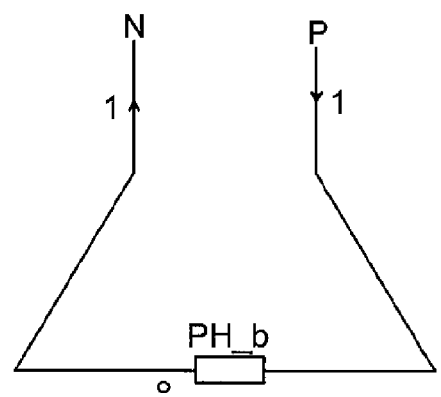
FIG. 4B displays in a schematic circuit diagram a connection during braking for the induction motor and the softstarter connected inside delta according to a yet further embodiment of the invention.

When the induction motor and the softstarter are connected in the configuration commonly named inside delta, two of the lines, in the illustrated case the two lower lines, of the softstarter are disconnected and two of the phases of the induction motor (in the illustrated case phases Ph_a and Ph_c) are left disconnected as being illustrated in FIG. 4b. The induction motor is again connected to only two of the phases of the three-phase mains.

Alternatively, if external switches were available all three phases of the induction motor could be connected in series with one another between two phases of the three-phase mains, and one of them should have the order of the terminals reversed with respect to the others, in order to generate a electromagnetic field of proper intensity. At least one of the lines of the softstarters has to be connected in series with the phases of the induction motor in order to generate controllable electromagnetic torque during braking of the motor.

Algorithm for Generating Electromagnetic Torque

The electromagnetic torque of a three-phase electric motor can be expressed in the following way in general, when all three phases are used:

$$Tem=CM[(Phi\_c-Phi\_b)iPh\_a+(Phi\_a-Phi\_c) iPh\_b+(Phi\_b-Phi\_a)iPh\_c]$$

where Phi_a, Phi_b, Phi_c are the magnetic fluxes linked with the windings of the stator phases of the electric motor, iPh_a, iPh_b, iPh_c are the currents in the stator phases of the electric motor, and CM is a constant including also the number of pole pairs. Reference is made to Peter Vas, Parameter Estimation, Condition Monitoring, and Diagnosis of Electric Machines, Monographs in Electrical and Electronic Engineering, Vol. 27, pages 80-87, Mar. 18, 1993, the contents of which being hereby incorporated by reference.

Figure 5:
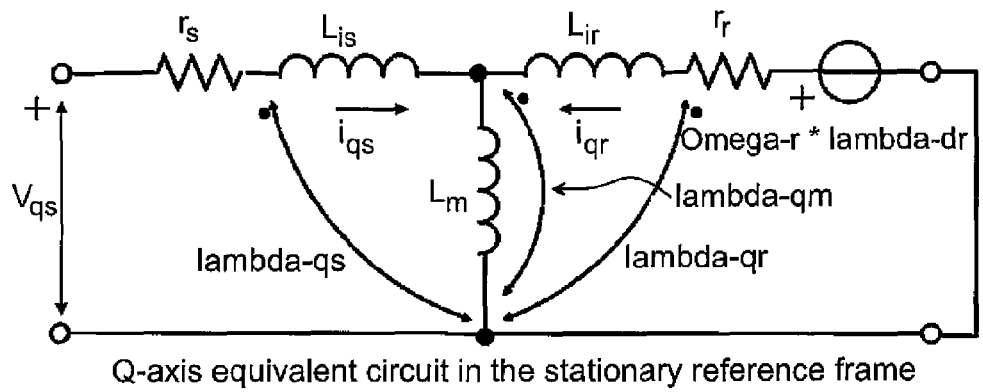
FIG. 5 displays in schematic circuit diagrams equivalent circuits used for modeling a squirrel-cage induction motor.
Figure 5:
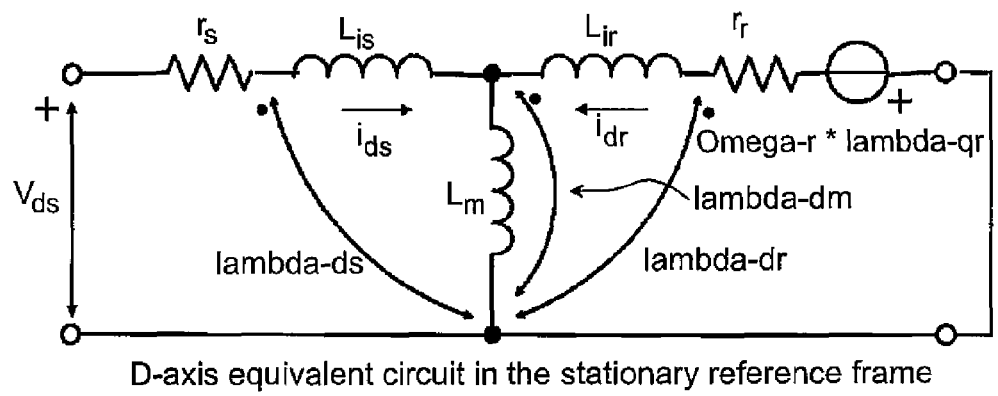
Figure 5:
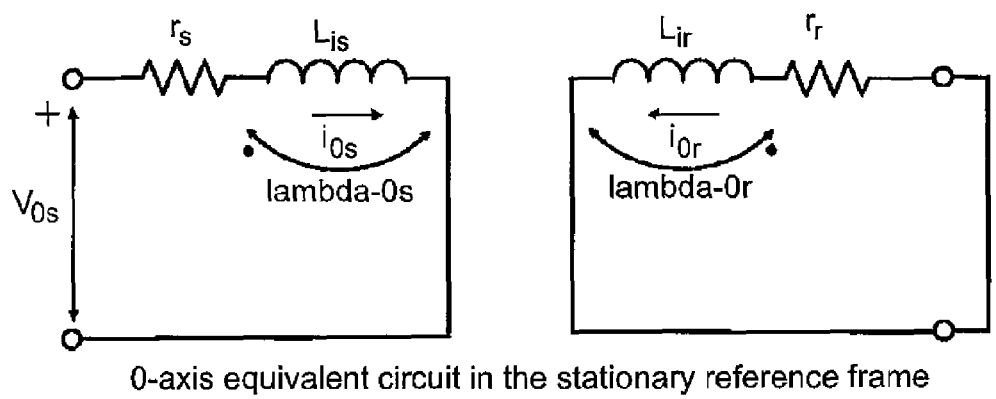

In the special case of braking and using only two mains phases the formula reduces to a simpler one. It can be shown that for the connections disclosed in FIGS. 3a, 4a, and 4b and using the model of FIG. 5, which shows schematic circuit diagrams equivalent circuits used for the squirrel-cage asynchronous motor in the qd0 stationary reference frame, the electromagnetic torque Tem of the induction motor can be written as $$Tem = CM1 \cdot \lambda_{qs} \cdot iTransf\_b$$

for the induction motor connected in Y configuration and the softstarter connected in line (FIG. 3a), $$Tem = CM2 \cdot \lambda_{ds} \cdot iTransf\_b$$

for the induction motor connected in delta configuration and the softstarter connected in line (FIG. 4a), and $$Tem = CM3 \cdot \lambda_{ds} \cdot iTransf\_b$$

for the induction motor connected in delta configuration and the softstarter connected inside delta, respectively.

Here, CM1, CM2, and CM3 are constant numbers comprising also the number of pole pairs of the electric motor, which is a characteristic of the motor, $\lambda_{qs}$ and $\lambda_{ds}$ are functions of the stator fluxes of the induction motor in the qd0 stationary reference frame, and iTransf_b is, as already disclosed, the current through the line of the softstarter whose thyristors are controlled to generate electromagnetic torque.

In all cases the expression of the electromagnetic torque Tem has been reduced to a sum of three products. In the special case represented by the disclosed braking arrangement for an induction motor, said sum of products degenerates to one product of one function of fluxes and one mains current only. In each of the three products composing said sum only two quantities are time-varying. One of them is directly measured by the softstarter (the phase current which is iTransf_b in the description of braking) whereas the other is a function of the magnetic fluxes (and/or currents) linked with the stator phase windings of the motor and can be estimated using the motor terminal voltages and/or currents which in turn are obtainable through the voltages and/or currents as measured by the softstarter. Alternatively, a device for directly measuring an electromagnetic field of the induction motor and means for calculating the functions of the stator fluxes of the induction motor based on the measured electromagnetic field can be used.

A description of the developed algorithm that performs the synthesis of negative electromagnetic torque in real time is given here for the configuration with the induction motor connected in Y and the softstarter connected in line. The extension to the other two cases is immediate by inspection of their torque expression just disclosed.

The synthesis of positive electromagnetic torque descends straightforwardly as well. In order to change the sign of the torque indeed, it is sufficient to check that the signs of the functions of the stator fluxes are opposite to those disclosed in the subsequent description.

Further, the extension to the general case with connection to all three phases of the mains is straightforward by observing the formula at the beginning of this subchapter and by applying the algorithm to each of the three products composing it.

Figure 6:
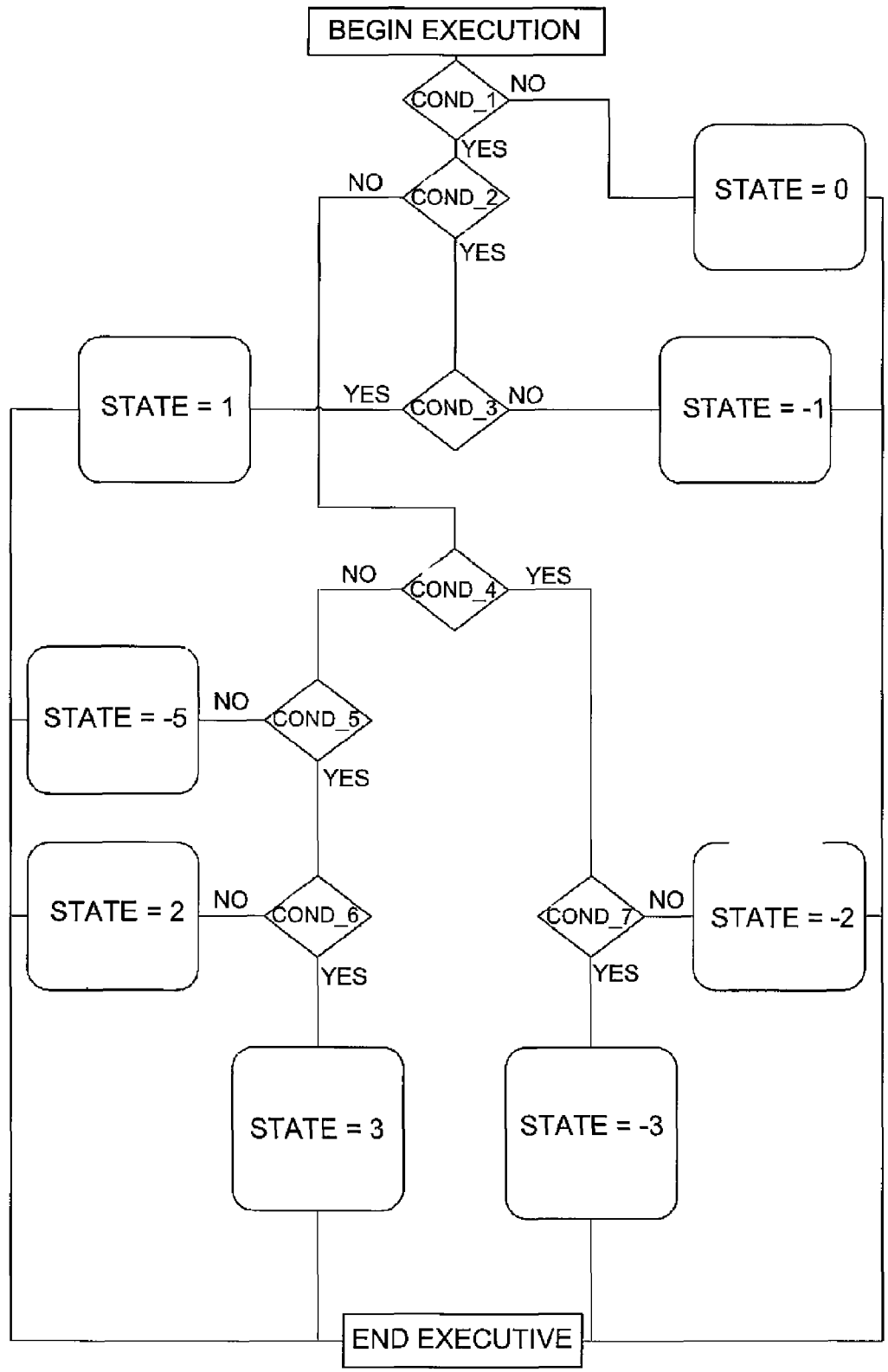
FIG. 6 is a flow diagram of a method for generating electromagnetic torque according to an embodiment of the invention.

The execution of the algorithm, of which FIG. 6 is a flow scheme, begins by checking, in a step COND_01, if pulses are enabled, that is, if torque generation is still desired to occur and no commands from a possible upper level controller have stopped the firing of the thyristors in response to other conditions in the system. If pulses are not enabled, the torque generation is, in a step STATE=0, considered terminated, a timer is reset, and the execution of the algorithm is ended.

If pulses are enabled, it is, in a step COND_02, checked whether the modulus of the voltage over the thyristor pair commanding the current present in the product is below a threshold. This is a test whether any of the thyristors of the pair is conducting. Alternatively, the current can be measured directly. If the voltage over the thyristor pair is below the threshold and consequently one of the thyristors of the pair is conducting, it is, in a step COND_03, checked whether the current is positive or not. A positive current implies that the thyristor Tbp is conducting and if this is the case, the thyristor Tbp can, in a step STATE=1, be fired again and the execution of the algorithm is ended. If the current is not positive, which implies that the thyristor Tbm is conducting, the thyristor Tbm can, in a step STATE=−1, be fired again, the timer is reset, and the execution of the algorithm is ended. The steps COND_03, STATE=1, and STATE=−1 could be dispensed with according to the nature of the thyristors, but good technical practice usually suggests to perform them.

If the modulus of the voltage over the thyristor pair is not below a threshold, that is, if none of the thyristors of the pair is conducting, several conditions are checked in a step COND_04.

It is checked whether the voltage over the thyristor pair has a positive sign, it is checked whether the function of the stator fluxes (and/or currents) involved in the product has a positive sign, and it is checked whether a time derivative (total or partial time derivative) of the function of stator flux has the same sign as the function of the stator fluxes. If all three conditions are fulfilled the thyristor Tbm may be fired. The first condition ensures that there is a forward voltage drop over the thyristor Tbm, the second condition ensures that the generated torque will be negative according to the structure of the product, and the last condition ensures that the probability that the function of stator fluxes changes sign during the conduction time of the thyristor Tbm is reduced; otherwise the electromagnetic torque of the electric motor would change sign during a latter part of the conduction time of the thyristor Tbm, a usually undesired condition that can worsen the performances of the operation. The time derivative of the function of the stator fluxes can be determined directly as a linear combination of the motor voltages and/or currents. The last condition is optional.

If the conditions are not met, it is, in a step COND_05, checked whether the voltage over the thyristor pair has a negative sign, it is checked whether the function of the stator fluxes has a negative sign, and it is checked whether the derivative of the function of the stator fluxes has the same sign as the function of the stator fluxes. If all three conditions is fulfilled the thyristor Tbp may be fired. The first condition ensures that there is a forward voltage drop over the thyristor Tbp, the second condition ensures that the generated torque will be negative according to the structure of the product, and the last condition ensures that the probability that the function of the stator fluxes changes sign during the conduction time of the thyristor Tbp is reduced. The last condition is again optional.

If not all these conditions are met no negative torque can be generated at this point of time. None of the thyristors are fired. The timer is, in a step STATE=−5, reset, and the execution of the algorithm is ended.

If, however, the conditions in step COND_05 are met, it is, in a step COND_06, checked whether the timer is beyond a desired fire delay for Tbp. The desired fire delay is a delay which is introduced in order to adjust the intensity of the braking torque to a desired one. Typically, the longer one waits before firing the thyristors the smaller will the current peak be and the smaller will the peak of the electromagnetic torque be. Since the torque can be estimated or even measured during the flowing of the currents, the intensity adjustment may be performed in a feedback loop, i.e. the desired fire delay can be controlled dynamically in response to the esteem or measure of the generated torque in one or several previous firings of the thyristors.

If the timer is not beyond the desired fire delay for Tbp the execution of the algorithm is, in a step STATE=2, ended. The thyristors are not fired and the timer is not reset.

If the timer is beyond the desired fire delay for Tbp, the thyristor tbp is, in a step STATE=3, fired, the timer is reset, and the execution of the algorithm is ended.

Turning back now to the step COND_04 and following the track of the algorithm when the conditions in step COND_04 are met, it is, in a step COND_07, checked whether the timer is beyond a desired fire delay for Tbm. The desired fire delay for Tbm is generally different from the fire delay for Tbp, but frequently they are equal. If the timer is not beyond the desired fire delay for Tbp the execution of the algorithm is, in a step STATE=−2, ended. The thyristors are not fired and the timer is not reset. If the timer is beyond the desired fire delay for Tbp, the thyristor tbp is, in a step STATE=−3, fired, the timer is reset, and the execution of the algorithm is ended.

The algorithm is naturally executed repeatedly or continuously during a braking process of the electric motor.

It shall be appreciated that if the intensity of the generated torque shall not, or need not to be, controlled, the timer and the steps related to the timer and the desired fire delay may be dispensed with.

Further, in order to distribute evenly the load among the phases of the grid and among the phases of the induction motor, the electric motor may be switched such that the three-phases thereof are periodically and cyclically permutated while maintaining their characteristic sequence.

The control algorithm is preferably realized by a real time digital controller or microcomputer even if analogous circuitry could execute it.

The invention relates also to a computer program product loadable into the internal memory of a microcomputer and comprising software code portions for controlling the method as disclosed above when said product is run on a computer.

While the electric motor has been described as an induction motor, and is particularly suitable for squirrel-cage type or wound-rotor type of motors, the invention is applicable to other kind of electric motors since the general expression of the torque applies to several types of electrical machines, including electric motors and generators. Reference is made to the above disclosed Peter Vas, Parameter Estimation, Condition Monitoring, and Diagnosis of Electric Machines, Monographs in Electrical and Electronic Engineering, Vol. 27, pages 80-87, Mar. 18, 1993.

Generalization to N Phases

It shall be appreciated that the apparatus for generating electromagnetic torque of desired sign and optionally of controllable intensity of the present invention is not only limited to three-phase electric machines, be them motors or generators, but it is applicable to N-phase electric machines where N is any positive number. The electromagnetic torque of electric machines of any number N of phases can be expressed as a sum of N products of quantities associated with the stator windings only. Reference is here made to P. Vas, J. E. Brown, Real-time monitoring of the electromagnetic torque of multiphase A. G. Machines, 1985 IEEE Industry Applications Conference (IAS) pp. 732-737, the contents of which being hereby incorporated by reference. Each of the products is pertinent to one phase and is the product of functions of stator and/or rotor fluxes and currents. Most commonly, but not exclusively, the product involves the specific phase current and a linear combination of the fluxes associated with other phases. The algorithm disclosed above in the case of braking allows to achieve the desired sign and optionally regulated intensity for a generic product of one phase current, or linear combination of phase currents—controlled by one thyristor pair—and one function of stator and/or rotor fluxes in the electric machine. The algorithm is extended to achieve the desired sign and regulated intensity in each of the products added together to form the total electromagnetic torque. At each instant of time (continuous or discrete) the algorithm disclosed with reference to FIG. 6 is executed independently for each product in the sum which is related to one specific phase current, or linear combination of phase currents, controllable by one thyristor pair. The decision whether to fire a thyristor or not, and optionally when to fire the thyristor, is taken according to the above disclosed algorithm.

It shall be appreciated that a thyristor pair may be by-passed by a by-pass switch and not used in the generation of the electromagnetic torque. This may be the case in a thyristor pair failure. Additionally, some lines might not have any thyristor pair at all but just a direct connection. However, the less thyristor pairs are available and used in the generation of electromagnetic torque for starting, accelerating, decelerating, and/or stopping the machine, usually the less controllable the electromagnetic torque becomes.

The N-phase electric motor can be e.g. a star-connected multiphase machine composed of elementary singularly and independently Y-connected subnetworks sharing a common node or being galvanically isolated, a multiphase machine connected in polygon, or a multiphase machine connected in a generalized version of the configuration commonly named inside delta.

The invention is suitable for multiphase machines of any voltage rating. Further, the invention can be used to produce motor starting, accelerating, braking, and stopping torque profiles which are specific and desired for the different applications in which the softstarters are used.

What is claimed is:

1. An apparatus for generating electromagnetic torque in an N-phase electric machine, wherein N is a positive integer, said apparatus comprising:

N lines, each of the N lines including an input terminal, an output terminal, and at least a pair of thyristors, or of one thyristor and one diode, connected between the input terminal and the output terminal such that the cathode of one of the components in the thyristor or diode-thyristor pair is connected to the anode of the other one of the components in the thyristor or diode-thyristor pair and the cathode of said other one of the components in the thyristor or diode-thyristor pair is connected to the anode of said one of the components in the thyristor or diode-thyristor pair, wherein the N lines are connected between a mains and the electric machine; and an apparatus provided for repeatedly or continuously determining at least the sign of a voltage over the thyristor or diode-thyristor pair in at least one of the N lines;

means provided for repeatedly or continuously determining at least one parameter related to the electromagnetic field in said electric machine, and a time derivative thereof; and a control device provided for controlling the operation of the thyristor or diode-thyristor pair of said at least one of the N lines in response to (i) at least said determined sign of the voltage, (ii) at least the sign of said determined parameter related to the electromagnetic field in said electric machine, and (iii) at least the sign of the time derivative of said determined parameter related to the electromagnetic field in said electric machine.

2. The apparatus of claim 1 wherein said parameter related to the electromagnetic field in said electric machine is a function of magnetic fluxes and/or electric currents associated with the stator and/or rotor phase windings of said electric machine.

3. The apparatus of claim 2 comprising apparatuses suitable to measure voltages provided for repeatedly or continuously measuring voltages over thyristor or diode-thyristor pairs of the N lines and line-to-line voltages at the input terminals of the N lines at the output terminals of the N lines or at terminals of said electric machine; and/or apparatuses suitable to measure line currents, wherein said means for determining is provided to evaluate the function of the magnetic fluxes and/or electric currents associated with the stator and/or rotor phase windings of said electric machine, each time based on repeatedly or continuously measured voltages, line-to-line voltages, and/or line currents.

4. The apparatus of claim 2 wherein the control device is arranged to repeatedly fire at least one thyristor of the thyristor or diode-thyristor pair in said at least one of the N lines, each time only when the following conditions are met:

the determined sign of the voltage over the thyristor or diode-thyristor pair gives for the thyristor a forward bias; and the forward conducting thyristor's current is directed such that, taken into account at least the sign of the function of the magnetic fluxes and/or electric currents, an electromagnetic torque of desired sign will be generated.

5. The apparatus of claim 2 comprising means for determining a time derivative of the function of the magnetic fluxes and/or electric currents, wherein the control device is arranged to repeatedly fire each thyristor of the thyristor or diode-thyristor pair in said at least one of the N lines only if at least the sign of the function of the magnetic fluxes and/or electric currents and at least the sign of the time derivative of the function of the magnetic fluxes and/or electric currents are in specified correlations.

6. The apparatus of claim 2 wherein the control device is arranged to repeatedly fire at least one thyristor of the thyristor or diode-thyristor pair in said at least one of the N lines, each time after the expiry of a selected time delay, thereby generating an electromagnetic torque of desired intensity.

7. The apparatus of claim 1 comprising apparatuses provided for repeatedly or continuously measuring at least the signs of voltages over the thyristor or diode-thyristor pair in a selected plurality of the N lines; and means provided for repeatedly or continuously determining parameters related to the electromagnetic field in said electric machine; wherein the control device is provided for controlling the operation of the thyristor or diode-thyristor pair of said selected plurality of the N lines in response to at least said determined signs of the voltages over the thyristor or diode-thyristor pair in the selected plurality of the N lines and said determined parameters related to the electromagnetic field in said electric machine.

8. The apparatus of claim 1 comprising apparatuses provided for repeatedly or continuously determining at least the sign of a voltage over the thyristor or diode-thyristor pair in each one of the N lines; and means provided for repeatedly or continuously determining parameters related to the electromagnetic field in said electric machine; wherein the control device is provided for controlling the operation of the thyristor or diode-thyristor pair of each one of the N lines in response to said determined sign of the voltage over the thyristor or diode-thyristor pair in each one of the N lines and said determined parameters related to the electromagnetic field in said electric machine.

9. The apparatus of claim 1 comprising, for each of the N lines, a switch connected in parallel with the thyristor or diode-thyristor pair of that line, which can be closed, thereby by-passing the thyristor or diode-thyristor pair of that line, or open.

10. The apparatus of claim 1 wherein N is 3 and the input terminals of the three lines are connected to output terminals of a three-phase mains.

11. The apparatus of claim 10 provided for braking said electric machine, wherein the apparatus comprises means provided for connecting/disconnecting said electric machine such that electric current can flow in no more than two phases of the three-phase mains via said at least one of the three lines.

12. The apparatus of claim 11 wherein said electric machine is connected in Y configuration; and said means provided for connecting/disconnecting is arranged to disconnect a second one of the three lines from the three-phase mains, allowing electric current to flow only in two of the three phases of the three-phase mains.

13. The apparatus of claim 11 wherein said electric machine is connected in delta configuration; and said means provided for connecting/disconnecting is arranged to disconnect a second one of the three lines from the three-phase mains, thereby connecting two of the phases of the electric machine in series and a last one of the phases of the electric machine in parallel with the two phases of the electric machine connected in series, allowing electric current to flow only in two of the three phases of the three-phase mains, but in all three phases of the electric machine.

14. The apparatus of claim 11 wherein said electric machine and the three lines are connected in the configuration commonly named inside delta; and said means provided for connecting/disconnecting is arranged to disconnect a second one and a third one of the three lines from the three-phase mains, allowing electric current to flow in two of the three phases of the three-phase mains but only in one of the three phases of the electric machine.

15. The apparatus of claim 10 wherein the control device is arranged for connecting the electric machine such that the three-phases thereof are periodically and cyclically permutated maintaining their sequence.

16. The apparatus of claim 1 wherein said electric machine is an electric motor, preferably an induction motor.

17. A method for generating electromagnetic torque in an N-phase electric machine, N being a positive integer, by means of N lines, each of the N lines including an input terminal, an output terminal, and at least a pair of thyristors, or of one thyristor and one diode, connected between the input terminal and the output terminal such that the cathode of one of the components in the thyristor or diode-thyristor pair is connected to the anode of the other one of the components in the thyristor or diode-thyristor pair and the cathode of said other one of the components in the thyristor or diode-thyristor pair is connected to the anode of said one of the components in the thyristor or diode-thyristor pair, wherein the N lines are connected between a mains and the electric machine, the method comprising the steps of:

- repeatedly or continuously determining at least the sign of a voltage over the thyristor or diode-thyristor pair in at least one of the N lines;
- repeatedly or continuously determining at least one parameter related to the electromagnetic field in said electric machine, and a time derivative thereof; and
- controlling the operation of the thyristor or diode-thyristor pair of said at least one of the N lines in response to (i) at least said determined sign of the voltage, (ii) at least the sign of said determined parameter related to the electromagnetic field in said electric machine, and (iii) at least the sign of the time derivative of said determined parameter related to the electromagnetic field in said electric machine.

18. The method of claim 17 wherein said parameter related to the electromagnetic field in said electric machine is a function of magnetic fluxes and/or electric currents associated with the stator and/or rotor phase windings of said electric machine.

19. The method of claim 17 provided for braking said electric machine, wherein

- N is 3 and the input terminals of the three lines are connected to output terminals of a three-phase mains; and
- said electric machine is connected such that electric current can flow in no more than two phases of the three-phase mains via said at least one of the three lines during the braking.

20. A computer program product loadable into the internal memory of a computer and comprising software code portions for controlling a method for generating electromagnetic torque in an N-phase electric machine, when said product is run on a computer, N being a positive integer, by means of N lines, each of the N lines including an input terminal, an output terminal, and at least a pair of thyristors, or of one thyristor and one diode, connected between the input terminal and the output terminal such that the cathode of one of the components in the thyristor or diode-thyristor pair is connected to the anode of the other one of the components in the thyristor or diode-thyristor pair and the cathode of said other one of the components in the thyristor or diode-thyristor pair is connected to the anode of said one of the components in the thyristor or diode-thyristor pair, wherein the N lines are connected between a mains and the electric machine, the method comprising the steps of:

- repeatedly or continuously determining at least the sign of a voltage over the thyristor or diode-thyristor pair in at least one of the N lines;
- repeatedly or continuously determining at least one parameter related to the electromagnetic field in said electric machine, and a time derivative thereof; and
- controlling the operation of the thyristor or diode-thyristor pair of said at least one of the N lines in response to (i) at least said determined sign of the voltage, (ii) at least the sign of said determined parameter related to the electromagnetic field in said electric machine, and (iii) at least the sign of the time derivative of said determined parameter related to the electromagnetic field in said electric machine.

* * * * *